(12) United States Patent
Tavares et al.

(10) Patent No.: US 8,413,501 B2
(45) Date of Patent: Apr. 9, 2013

(54) WAKE MEASUREMENT PROBE

(75) Inventors: Matthew R. Tavares, Federal Way, WA (US); Carter T. Nelson, Seattle, WA (US); Daniel J. Wright, Mercer Island, WA (US); John C. Woo, Newcastle, WA (US); Bruce A. Faulkner, Kent, WA (US)

(73) Assignee: The Boeing Company, Chicago, IL (US)

( * ) Notice: Subject to any disclaimer, the term of this patent is extended or adjusted under 35 U.S.C. 154(b) by 440 days.

(21) Appl. No.: 12/732,299

(22) Filed: Mar. 26, 2010

(65) Prior Publication Data

US 2011/0232378 A1 Sep. 29, 2011

(51) Int. Cl.
*G01P 13/00* (2006.01)

(52) U.S. Cl. .................................................. 73/170.02
(58) Field of Classification Search ........................ None
See application file for complete search history.

(56) References Cited

U.S. PATENT DOCUMENTS

| | | | | |
|---|---|---|---|---|
| 4,212,199 A | * | 7/1980 | Bikle et al. | 73/861.66 |
| 4,559,836 A | * | 12/1985 | Coleman et al. | 73/861.66 |
| 7,313,963 B2 | * | 1/2008 | Kuznar | 73/700 |
| 2012/0097270 A1 | * | 4/2012 | Susko | 137/551 |

* cited by examiner

*Primary Examiner* — Andre Allen
(74) *Attorney, Agent, or Firm* — Parsons Behle & Latimer

(57) ABSTRACT

A probe includes a stem having a tip that measures a wake produced by an object moving through a fluid. The probe includes temperature and pressure sensors co-located in the tip.

24 Claims, 6 Drawing Sheets

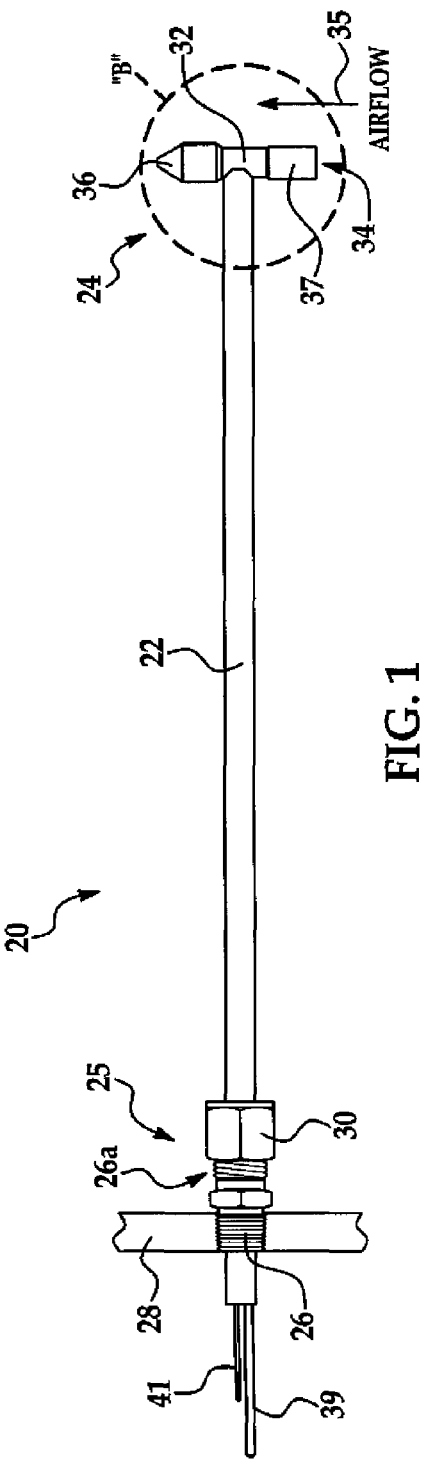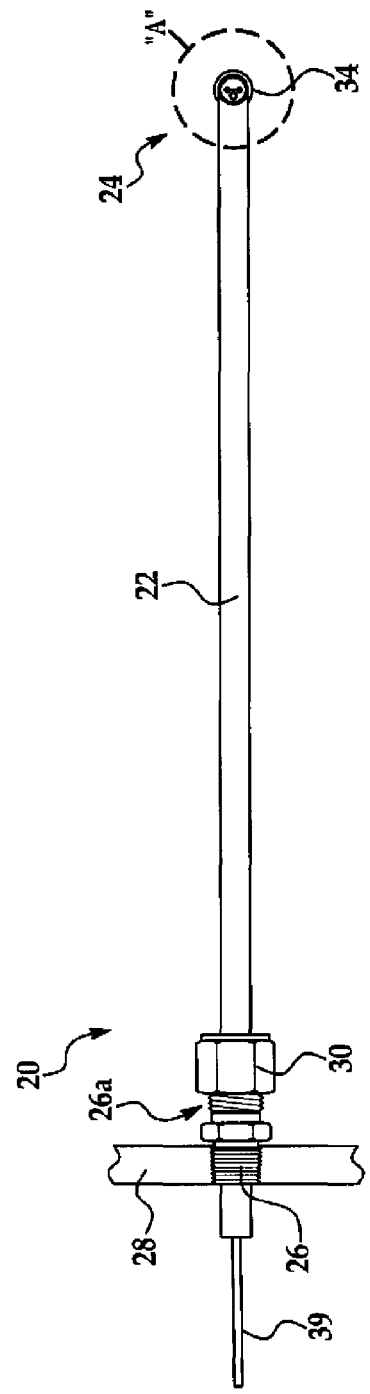

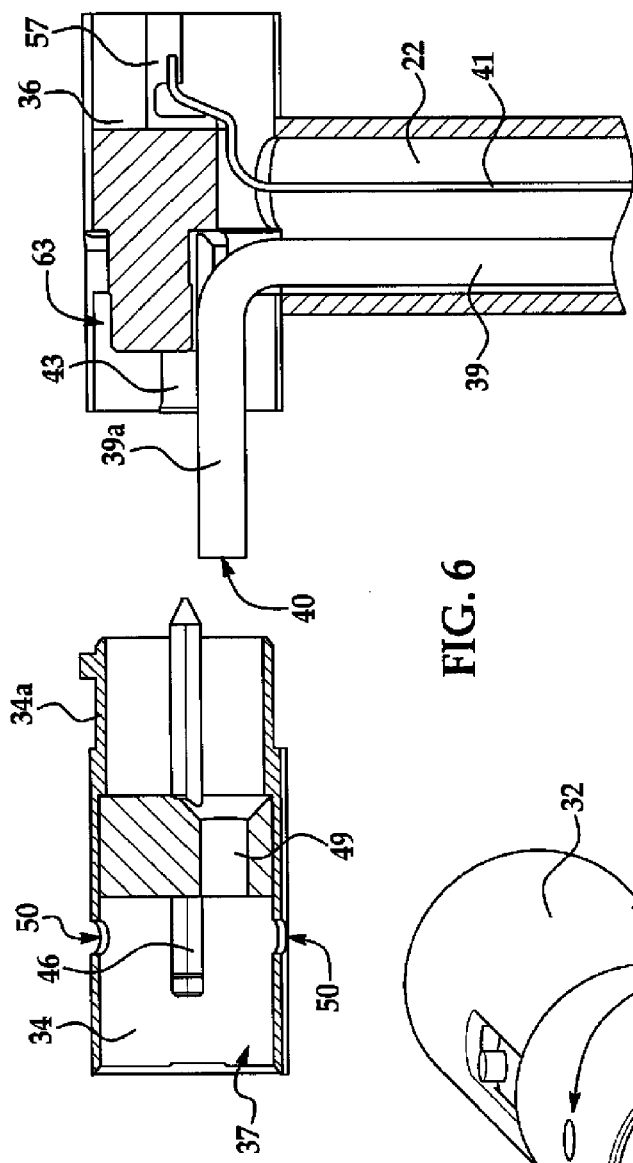
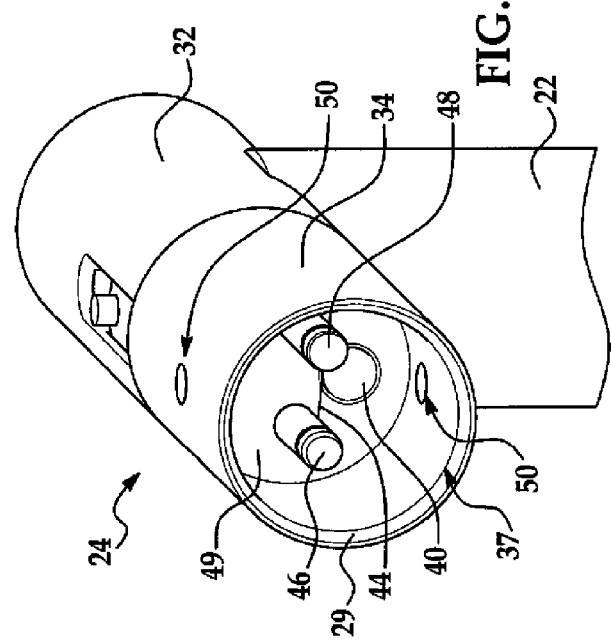
FIG. 6
FIG. 7

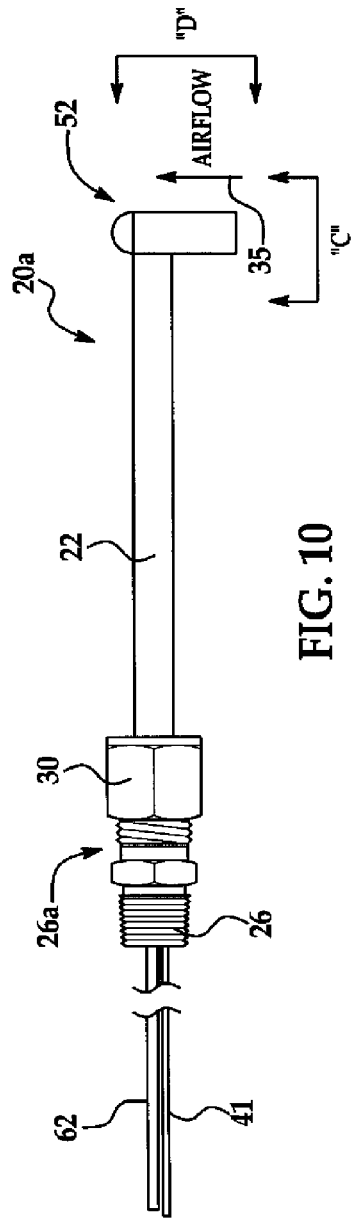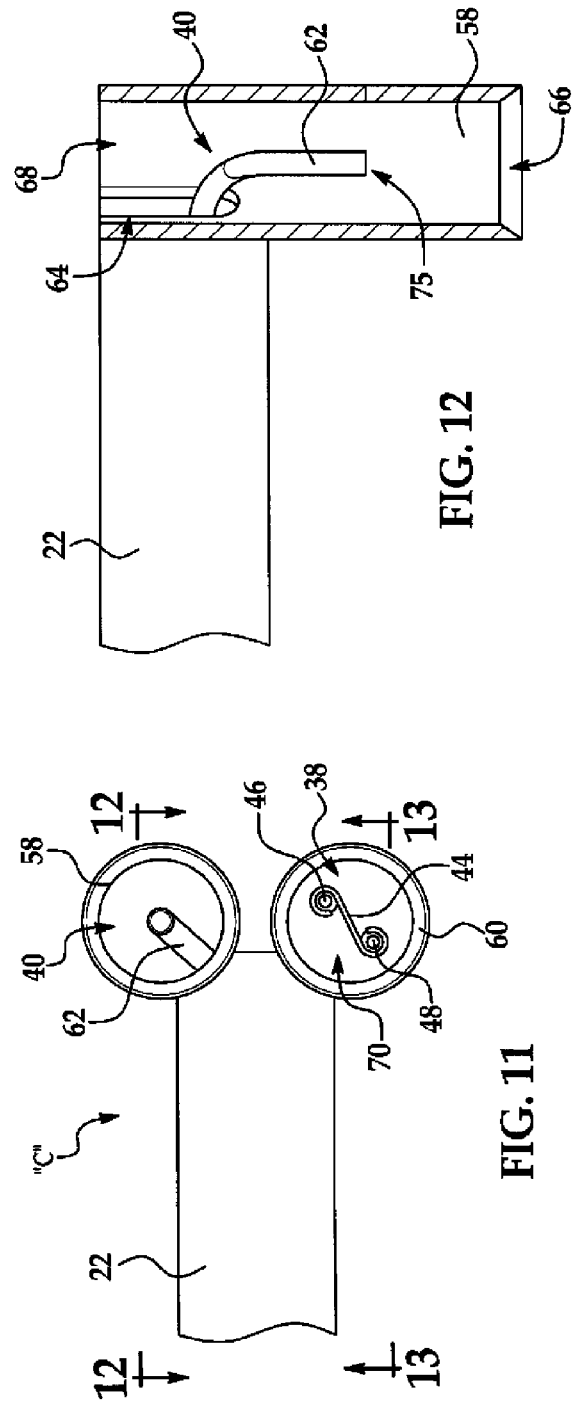

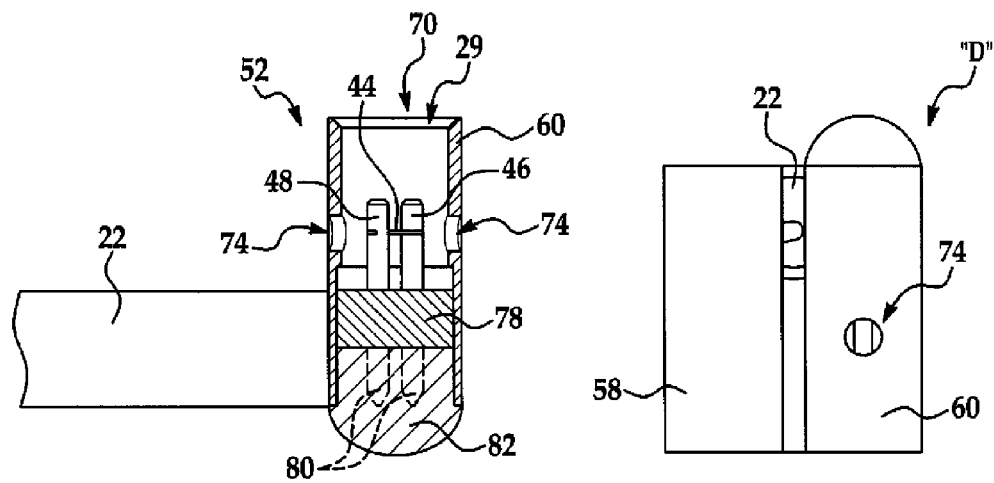
FIG. 13
FIG. 14
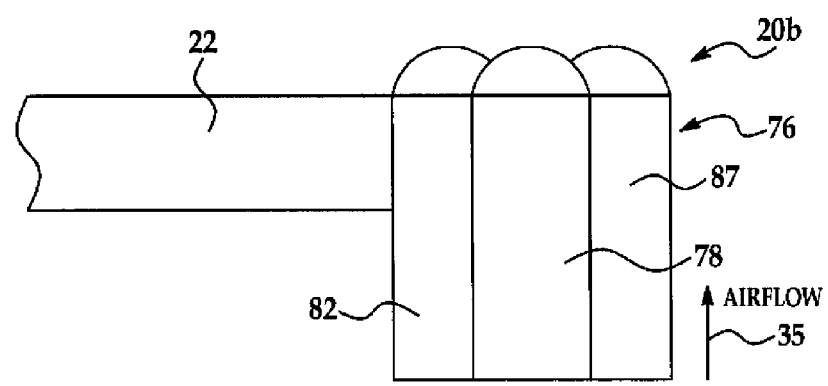
FIG. 15
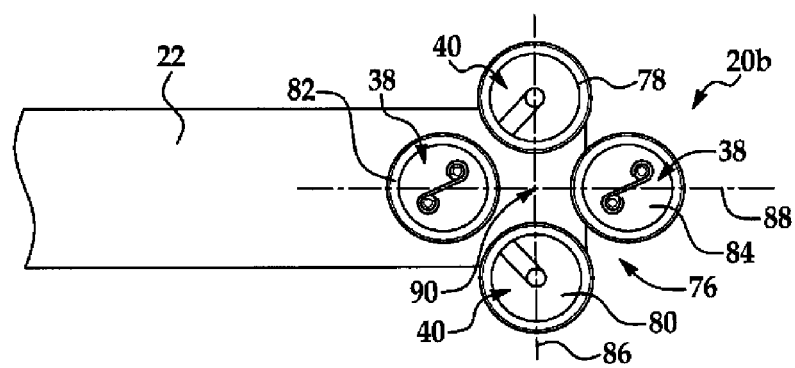
FIG. 16

WAKE MEASUREMENT PROBE

STATEMENT REGARDING FEDERALLY SPONSORED RESEARCH OR DEVELOPMENT

The invention described herein was made in the performance of work under NASA Contract No. NNL04AA11B and is subject to the provisions of Section 305 of the National Aeronautics and Space Act of 1958 (72 Stat.435:42 U.S.C. 2457).

TECHNICAL FIELD

This disclosure generally relates to devices used to measure characteristics of a flowing fluid such as temperature and pressure, and deals more particularly with a probe for surveying wake turbulence, especially wake turbulence produced by aircraft.

BACKGROUND

Measurement of airflows over an object is routinely performed in the aircraft industry to study the aerodynamics of an aircraft. For example, it is sometimes necessary to survey and analyze wake turbulence that may form behind an aircraft. This type of turbulence may include various components, such as wing tip vortices and jetwash comprising rapidly moving gases expelled from a jet engine.

One technique used to survey and analyze wake turbulence involves making precise measurements of the temperature and pressure of the air which flows over aircraft features or which exits from the aircraft's engines. These measurements may be performed by simultaneously measuring the total temperature and total pressure of the air, generally at the same location. Existing equipment for measuring the temperature and pressure of an airflow may provide data that is less accurate than desired however, or which requires post-processing to correct for. For example, existing measurement equipment employs spatially separated temperature and pressure sensors. The spatial separation of the sensors results in measurement errors that may require spatial correction in order to obtain accurate measurement results. Also, in some cases, existing temperature and pressure sensors may be too slow to provide accurate measurements of rapidly moving, turbulent air. Finally, existing temperature and pressure sensors may be subject to fatigue failure and/or malfunction due to the collection of dirt or debris.

Accordingly, there is a need for a device for measuring wake turbulence that provides rapid, highly accurate, simultaneous measurement of temperature and pressure of the airflow, while obviating the need for spatial correction of sensor measurements. There is also a need for a wake measurement device that allows simple, quick field replacement or servicing of failed or poorly functioning components. The disclosed embodiments are intended to satisfy these needs.

SUMMARY

The disclosed embodiments provide a device for measuring wake turbulence that is useful in a variety of applications, including but not limited to measuring wake turbulence behind aircraft engines, wings, etc. The device comprises a probe that provides high speed, simultaneous measurement of the total temperature and total pressure of the turbulent air. In one embodiment, the probe includes a sensor tip having a portion that may be quickly removed and replaced when damaged or adversely affected by foreign debris. The probe employs a fast response thermocouple device that reacts quickly to rapid changes in airflow temperature. The need for spatial correction of measurement data is obviated by co-locating the temperature sensor and pressure sensor in a common keel. In one embodiment, the disclosed wake measurement probe is capable of measuring total temperature and total pressure of turbulent air at 1200 degrees F. and flowing at MACH 1+.

According to one disclosed embodiment, a wake measurement probe comprises an elongate support having a tip on one end thereof. A pressure sensor and a temperature sensor are co-located on the tip. The tip includes a first portion fixed to the support and a second portion that is removably mounted on the first portion and includes the temperature sensor.

According to another disclosed embodiment, a device is provided for sensing the temperature and pressure of a flowing fluid. The device includes a stem having first and second opposite ends, a tip on the first end of the stem, and a temperature sensor on the tip for sensing the temperature of the fluid flowing over the tip. The tip also includes a pressure sensor for sensing the pressure of the fluid flowing over the tip. The pressure sensor includes a stagnation tube having an open end adapted to face the flow of fluid and a pitot tube within the stagnation tube. In one embodiment, the temperature sensor comprises a thermocouple located in the stagnation tube.

According to a further embodiment, a device is provided for sensing a wake produced by an object moving through a fluid. The device comprises a stem having a tip on one end thereof. The tip includes a first portion fixed to the stem, and a removable second portion. Means are provided for releasably mounting the removable portion on the tip. The device further comprises a temperature sensor and a pressure sensor each located within the removable portion of the tip. In one embodiment, the pressure sensor includes a stagnation tube on the first portion and a temperature sensor located within the stagnation tube.

In still another embodiment, a probe measures wake turbulence behind an object moving through the air. The probe comprises an elongate stem having a tip on one end thereof. The tip includes a pair of spaced apart temperature sensors located along a first axis for sensing the temperature of the air flowing past the tip. The tip further includes a pair of pressure sensors located along a second axis extending traverse to and intersecting the first axis, for measuring the pressure of the air flowing over the tip.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIG. 1 is an illustration of a side view of a wake measurement probe according to the disclosed embodiments.

FIG. 2 is an illustration of a top plan view of the probe shown in FIG. 1.

FIG. 6 is a view similar to FIG. 5, but showing the removable tube portion of the tip separated from the stationary portion.

FIG. 7 is an illustration of a perspective view of the tip.

FIG. 10 is an illustration of a side view of an alternate embodiment of the wake measurement probe.

FIG. 11 is an illustration of a view in the direction designated as "C" in FIG. 10.

FIG. 12 is an illustration of a sectional view taken along the line 12-12 in FIG. 11.

FIG. 13 is an illustration of a sectional view taken along the line 13-13 in FIG. 6.

FIG. 14 is an illustration of a view in the direction designated as "ID" in FIG. 10.

FIG. 15 is an illustration of a side view of the tip of another embodiment of the wake measurement probe.

FIG. 16 is an illustration of an end view of the tip shown in FIG. 15.

DETAILED DESCRIPTION

Figure 3:
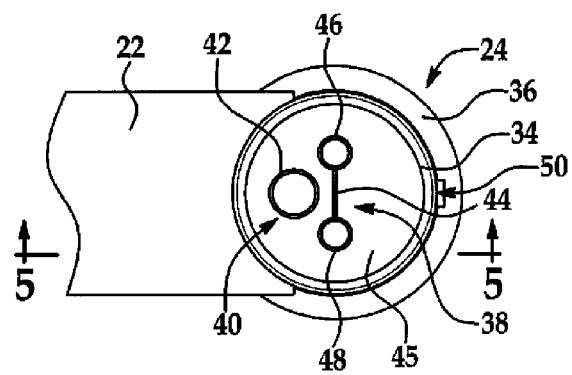
FIG. 3 is an illustration of an enlarged view of the area designated as "A" in FIG. 2.
Figure 4:
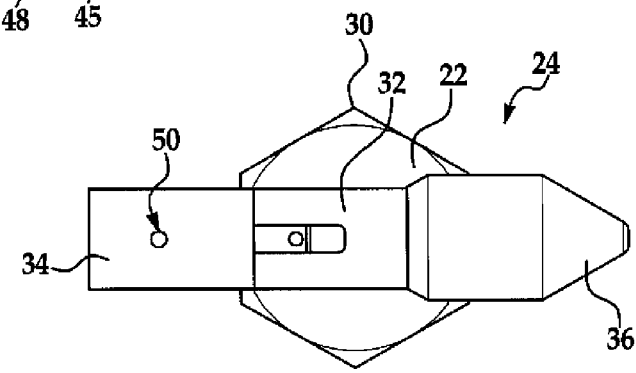
FIG. 4 is an illustration of the area designated as "B" in FIG. 1.

Referring to FIGS. 1-4, the disclosed embodiments relate to a device in the form of a probe 20 that may be used to measure certain characteristics of a moving fluid, such as the pressure and temperature of the fluid. The probe 20 may be used, for example, to survey wake turbulence (also referred to hereinafter as a "wake"), such as that produced by an aircraft during takeoffs, landings or in flight. The probe 20 broadly includes an elongate, substantially hollow stem 22 having a tip 24 on the outer end thereof. The tip 24 includes co-located temperature and pressure sensors 38, 40 for respectively performing high speed measurement of the total temperature and the total pressure of substantially the same volume of fluid. The probe 20 further includes means 25 on the other end of the stem 22 for mounting the probe 20 on a structure 281 such as the skin of an aircraft. In the illustrated example, the mounting means 25 comprises a threaded fitting 26 secured in the structure 28 and a nipple 26a that is adapted to threadably receive a nut 30. The nut 30 forms part of a compression fitting which seals the interior of the stem 22 against the intrusion of moisture and/or dust and debris.

The tip 24 includes a removable tube portion 34 that is releasably mounted on a fixed portion 32 secured to the outer end of the stem 22. The fixed portion 32 may include a conically shaped, trailing fairing 36. In the illustrated embodiment, the fixed and removable tube portions 32, 34 respectively, of the tip 24 are generally cylindrical, hollow housings and are oriented such that their longitudinal axes are substantially parallel with the direction of airflow, indicated by arrow 35, over the tip 24. The removable tube portion 34 of the tip 24 has an open outer end 37 facing the airflow 35.

Figure 5:
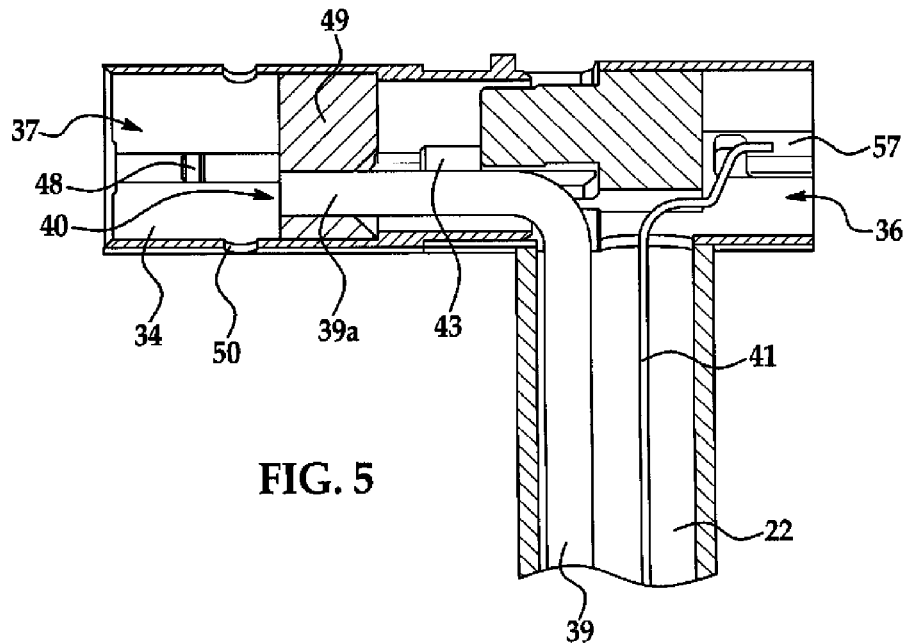
FIG. 5 is an illustration of a sectional view taken along the line 5-5 in FIG. 3, but wherein the trailing fairing has been removed.
Figure 8:
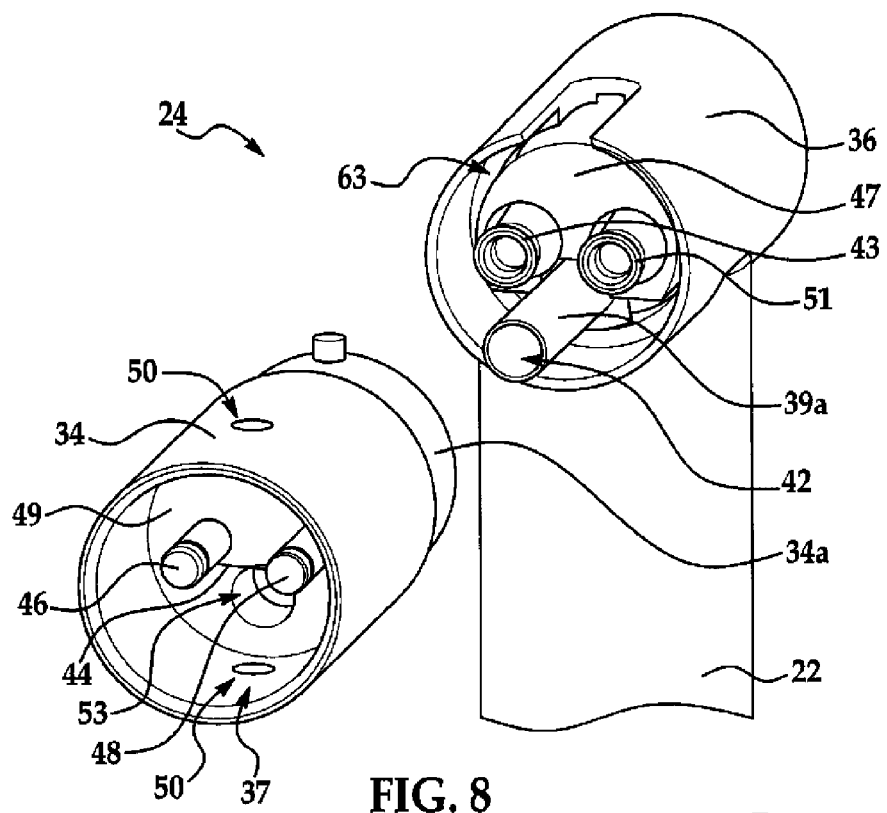
FIG. 8 is a view similar to FIG. 7, but showing the removable tube portion of the tip separated from the fixed portion.
Figure 9:
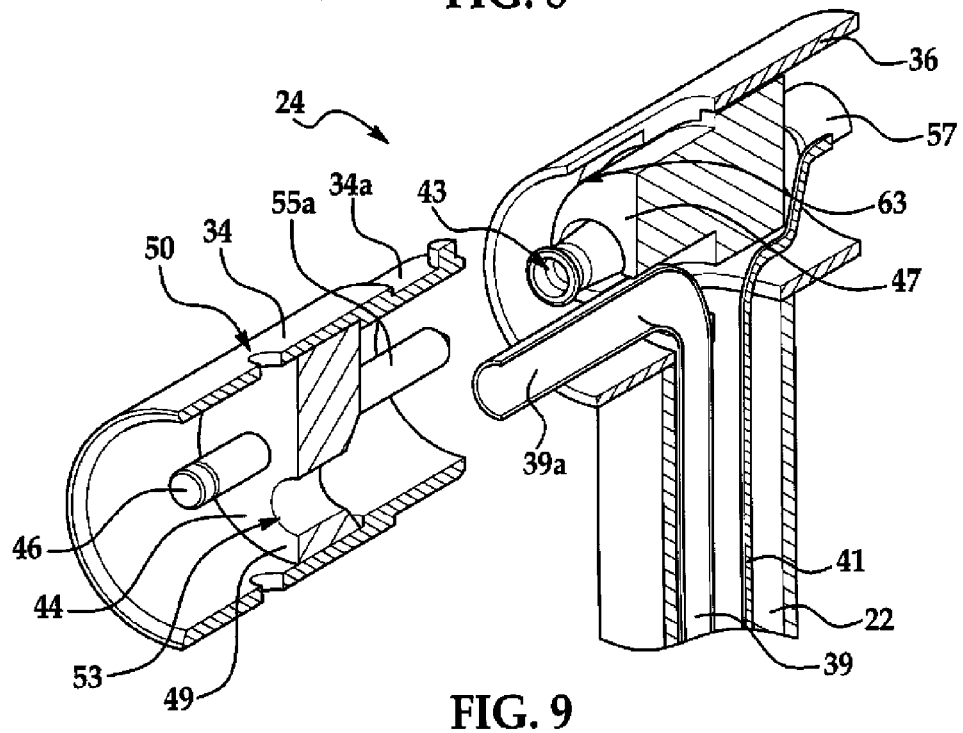
FIG. 9 is an illustration of a perspective view of the tip in longitudinal section

Referring particularly now to FIGS. 3-9, the probe 20 includes a temperature sensor 38 and a pressure sensor 40 co-located in a common keel on the tip 24 for respectively measuring the temperature and pressure of air flowing over the tip 24. The pressure sensor 40 may comprise, for example and without limitation, a pitot tube 39 that extends through the stem 22. The pitot tube 39 includes an outer end 39a passing through an opening 53 (see FIG. 8) in an insulating insert 49 that is fixed within the removable tube portion 34 of the tip 24. The outer end 39a of the tube 39 terminates in a total pressure port 42 that is disposed within the open end 37 of the removable tube portion 34, and faces the direction of airflow 35 (FIG. 1). The other end (not shown) of the pitot tube 39 is coupled with a suitable pressure measuring device (not shown) which measures the total air pressure.

The removable tube portion 34 surrounding the total pressure port 42 acts as a stagnation tube in which the airflow is brought to rest or stagnates since there is no substantial outlet to allow air flow to continue. As is well known in the art, this pressure is the stagnation pressure of the air, also known as the total pressure and often referred to in the aviation industry as the pitot pressure. The removable tube portion of the tip 24 includes a series of circumferentially spaced air outlet openings 50 that allow some small amount of air to escape so that fresh volumes of air may enter the tube portion for measurement.

The temperature sensor 38 may comprise a thermocouple that includes a fine gauge metal wire bead 44 stretched between and connected, as by welding to a pair of conductive posts 46, 48. The wire bead 44 extends generally orthogonal to the direction 35 of airflow (FIG. 1) over the tip 24, and provides rapid response to changes in the air temperature. The posts 46, 48 are held by a high temperature adhesive or by other means, in the cylindrical insert 49 which is fixed within the removable tube portion 34 of the tip 24. In one embodiment, the thermocouple 38 may comprise a chromel-constantan thermocouple bead. The port 42 and thermocouple wire bead 44 are co-located on the tip 24, as close together as practical. In this manner, the temperature and pressure of a volume of air is measured at substantially the same point, thus obviating the need for correcting measurements due to spatial differences in the locations of the temperature and pressure sensors 38, 40, respectively. The removable tube portion 34 may include a chamfered edge 29 (FIG. 7) to avoid producing undue turbulence in the air entering the outer end 37.

Each of the posts 46, 48 has a male plug 55 (FIGS. 6 and 9) that is received in snap-fit relationship within in a corresponding socket 43, 51 in the end of a conductive connector 57. Connector 57 is held in a second cylindrical insert formed of an insulating material which is secured within the fixed portion 36 of the tip 24, as by an adhesive or with screws (not shown). Two electrical wires 41 extending through the stem 22 electrically couple the connectors 57 with a measuring device (not shown) that coverts the signal output by the thermocouple to a reading representing the sensed air temperature.

The removable tube portion 34 of the tip 24 includes a reduced diameter, rear section 34a that is sleeved inside an end of the fixed portion 36 and is closely received within an annular groove 63 surrounding insert 47, with clearances selected to produce a friction fit between the removable and fixed portions of the tip 24. This friction fit relationship combined with the snap-fit connection between the plugs 55 and sockets 43, form a quick release, mechanical coupling between the removable and fix portions of the tip 24, allowing the removable tube portion 34 to be separated from the tip 24 quickly and easily in the field for servicing, repair or replacement. Other means may be used to releasably mount the removable tube portion 34 on the fixed portion 36, such as, without limitation, a threaded coupling or a spring load detent mechanism.

Attention is now directed to FIGS. 10-14 which illustrate another embodiment of the wake probe 20a. In this embodiment, a tip 52 comprises a pair of cylindrical tubes 58, 60 that are each fixed to the outer end of the stem 22. Tube 58 is substantially hollow and includes an inlet opening 66 oriented to face the airflow 35 (FIG. 10) and an outlet opening 68. A pressure sensor 40 includes a pitot tube 62 having an air inlet port 75 centrally disposed within the tube 58. The pitot tube 62 passes through an opening 64 in the sidewall of the tube 58, and extends down through the stem 22 where it is coupled with a device (not shown) that measures the total pressure of the air flowing through the tube 58.

A temperature sensor 38 is disposed in the second tube 60 for measuring the total temperature of the air flowing into the tube 60. The temperature sensor 38 comprises a thermocouple including a fine metal wire thermocouple bead 44 stretched between two posts 46, 48. Similar to the embodiment illustrated in FIGS. 1-9, the wire bead 44 extends generally orthogonal to the direction 35 of the airflow. Tube 60 includes an inlet opening 10 and one or more outlet openings 74 in the side wall of the tube 60 to allow the escape of air flowing into the inlet 70. The posts 46, 48 pass through and are bonded to an electrical insulator 78. The posts 46, 48 have lower extremities 80 secured in a potting compound 82 that fills the end of the tube 60 opposite the inlet opening 70. The metal posts 46, 48 are coupled with a temperature measuring device (not shown) by electrical wires 41 that pass through the stem 22. The tubes 58, 60 are located as close to each other as practical so that the sensors 38, 40 are substantially co-located and measure the temperature and pressure of substantially the same volume of air. Depending on the application and the desired level of measurement accuracy, some small amount of spatial correction may be necessary in the measurements made by the temperature and pressure sensors 38, 40 respectively because of the slight spatial separation of these two sensors.

Attention is now directed to FIGS. 15 and 16 which illustrate still another embodiment 20b of the wake measurement probe. In this embodiment, four tubes 78-84 are mounted on the tip 76 of the stem 22, each of which has an open end oriented to face the direction of airflow 35. The tubes 18-84 are arranged in spaced apart pairs 78-80 and 82-84 that respectively lie along mutually orthogonal axes 86, 88 which intersect at a geometric center 90. Each of the tubes 82, 84 contains a temperature sensor 38 of the type previously described, and each of the tubes 78, 80 contains a pressure sensor 40, also of the type previously described. Thus, the probe 20b employs two spaced part temperature sensors 38 and two spaced apart pressure sensors 40 to perform measurements of temperature and pressure of a volume of air whose geometric center at 90. The geometric center 90 also corresponds to the midpoint or center between each of the two pairs of sensors 38 and 40. Using one measurement technique, the outputs of each sensor pair may be averaged to obtain values of temperature and pressure of the air which may be attributed to a single point corresponding to the geometric center 90. Alternatively, the outputs of all four sensors 38, 40 may be separately used to calculate the temperature and pressure of a volume of air over a spatial area corresponding to the spatial positions of the sensors.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A wake measurement probe, comprising:
   an elongate support having a tip on one end thereof, the tip configured to align with a direction of wake airflow;
   a pressure sensor on the tip; and
   a temperature sensor on the tip co-located with the pressure sensor.

2. The device of claim 1, wherein:
   the tip includes a first portion fixed to the support and a second portion removably mounted on the first portion, and
   the temperature sensor is mounted on the second portion of the tip.

3. The device of claim 1, wherein:
   the tip includes a tube having an open end adapted to face air flowing over the tip, and
   the temperature sensor and the pressure sensor are located within the tube.

4. The device of claim 3, wherein the temperature sensor is a thermocouple.

5. The device of claim 4, wherein the thermocouple includes:
   a pair of posts mounted within the tube, and
   an electrically conductive wire having opposite ends respectively connected to the posts, the wire extending between the posts and generally orthogonal to the direction of the air flow over the tip for producing an electrical signal related to the temperature of the air flowing over the tip.

6. The device of claim 4, wherein the pressure sensor includes a port in close proximity to the thermocouple for measuring total pressure on the air flowing over the tip and into the opening end of the tube.

7. The device of claim 1, wherein:
   the tip includes first and second tubes each having an open end facing air flowing over the tip,
   the temperature sensor is located within the first tube, and
   the pressure sensor is located within the second tube.

8. The device of claim 7, wherein:
   the temperature sensor includes a thermocouple having a stretched wire bead extending in a direction generally orthogonal to the direction of air flow over the tip, and
   the second tube includes a stagnation tube and the pressure sensor include a pitot tube located within the stagnation tube.

9. A device for sensing the temperature and pressure of a flowing fluid, comprising:
   a stem having first and second opposite ends;
   a tip on the first end of the stem, the tip including a pressure sensor for sensing the pressure of the fluid flowing over the tip, the pressure sensor including a stagnation tube having an open end adapted to face the flow of the fluid and a pitot tube within the stagnation tube; and
   a temperature sensor on the tip for sensing the temperature of the fluid flowing over the tip.

10. The device of claim 9, wherein the temperature sensor includes a thermocouple located in the stagnation tube.

11. The device of claim 10, wherein the thermocouple includes:
    a pair of posts, and
    a thermocouple wire bead stretched between the posts and extending generally orthogonal to the flow of the fluid.

12. The device of claim 10, wherein:
    the tip further includes a second tube adjacent the stagnation tube,
    the second tube has an open end facing the flow of the fluid, and
    the thermocouple is located in the second tube.

13. The device of claim 12, wherein the stagnation tube and the second tube are disposed side-by-side in close proximity to each other.

14. The device of claim 9, wherein:
    the stem is elongate, and
    the second end of the stem includes a fitting for mounting the stem on a structure.

15. The device of claim 9, wherein:
    the thermocouple is mounted within the stagnation tube, and the tip includes means for removably mounting the stagnation tube on the stem to allow replacement of the thermocouple.

16. A device for sensing a wake produced by an object moving through a fluid, comprising:
a stem;
a tip on one end of the stem, the tip oriented to align with a direction of wake airflow, and including a first portion fixed to the stem and a second portion;
releasable means for removably mounting the second portion on the tip;
a temperature sensor; and
a pressure sensor,
the temperature sensor and the pressure sensor being located on the second portion of the tip.

17. The device of claim 16, wherein:
the pressure sensor includes a stagnation tube on the second portion, and
the temperature sensor is located within the stagnation tube.

18. The device of claim 16, wherein the releasable means includes at least one snap fit releasable connection between the first and second portions of the tip.

19. A probe for measuring wake turbulence behind an object moving through the air, comprising:
an elongate stem having a tip on one end thereof;
a pair of spaced apart temperature sensors on the tip located along a first axis for sensing the temperature of the air flowing past the tip; and
a pair of pressure sensors on the tip located along a second axis extending traverse to and intersecting the first axis, for measuring the pressure of the air flowing over the tip.

20. The probe of claim 19, wherein the temperature sensors are located substantially equidistant from the point of intersection of the first and second axes.

21. The probe of claim 20, wherein the pressure sensors are located substantially equidistant from the point of intersection of the first and second axes.

22. A method of sensing wake turbulence produced by an aircraft, comprising:
sensing the temperature and the pressure of substantially the same volume of air in the wake turbulence.

23. The method of claim 22, wherein the temperature and pressure are respectively sensed by a thermocouple and a pitot tube.

24. The method of claim 22, wherein the temperature and pressure are sensed substantially at the same location within a tube.

* * * * *